United States Patent [19]
Friedl et al.

[11] 4,078,877
[45] Mar. 14, 1978

[54] FUEL FEEDING DEVICE FOR A HEATING UNIT, ESPECIALLY FOR VEHICLES

[75] Inventors: Reiner Friedl, Starnberg; Rüdiger Galtz, Munich; Werner Hornfeck, Unterpfaffenhofen, all of Germany

[73] Assignee: Webasto-Werk W. Baier GmbH & Co., Germany

[21] Appl. No.: 748,461

[22] Filed: Dec. 8, 1976

[30] Foreign Application Priority Data

Dec. 11, 1975  Germany .............................. 2555719

[51] Int. Cl.² .............................................. F23C 3/02
[52] U.S. Cl. ...................................................... 431/1
[58] Field of Search ................... 431/1, 36, 37, 38, 20; 237/12.3 R, 12.3 A, 12.3 B, 12.3 C; 137/624.13, 624.14; 239/99

[56] References Cited
U.S. PATENT DOCUMENTS

| 2,191,176 | 2/1940 | McCollum | 237/12.3 C |
| 2,440,447 | 4/1948 | McCollum | 237/12.3 C |
| 2,691,413 | 10/1954 | Leslie et al. | 237/12.3 C X |
| 3,169,570 | 2/1965 | Haag et al. | 431/1 |
| 3,219,095 | 11/1965 | Nilsson | 431/1 X |

Primary Examiner—Edward G. Favors
Attorney, Agent, or Firm—Craig & Antonelli

[57] ABSTRACT

Fuel feeding apparatus is provided for a vehicle heater of the type having a combustion air fan connected by a combustion air feed line to a heater combustion chamber. A venturi tube is arranged in the feed line downstream of the combustion air fan and a fuel feed line and fuel nozzle opens into the air feed line at the venturi tube. A diaphragm pump is provided which has a first chamber, a fuel supply line inlet and an outlet at the fuel feed line to the venturi tube and a second chamber communicated with the air feed line at a position spaced from the venturi tube. A check valve is provided in the fuel feed line and a closure valve is provided at the fuel supply line leading to the first chamber. Movement of the diaphragm in the pumping direction is controlled exclusively by a pressure difference at the venturi tube and at the air feed line upstream of the venturi tube, while the suction stroke is controlled by an electromagnet. Switch means are provided for switching the electromagnet on at the end of the pumping stroke and off at the end of the suction stroke.

28 Claims, 3 Drawing Figures

4,078,877

FUEL FEEDING DEVICE FOR A HEATING UNIT, ESPECIALLY FOR VEHICLES

BACKGROUND AND SUMMARY OF THE INVENTION

This invention relates to a fuel feeding device for a heating unit, especially for vehicles of the type preferably comprising a combustion air fan, the feed line of which fans terminates in a combustion chamber and contains a constriction in the manner of a venturi tube, a fuel line ending in the feed line.

In some conventional vehicle heating units, an electromagnetically operated diaphragm pump is provided, the intake chamber of which is connected, via a first check valve, with an intake pipe in communication with a fuel tank and, via a second, oppositely effective check valve, with a feed line leading to a metering device, by means of which a fuel is introduced into the air feed line in dependence on the amount of air conveyed by the combustion air fan. This metering device consists of a differential pressure box with a diaphragm separating two chambers from each other, wherein the first chamber is connected via a shutoff valve actuated by the diaphragm with the feed line of the fuel pump, and furthermore, with the air feed line in the zone of the venturi tube, whereas the second chamber is in communication with the air feed line outside of the venturi tube. The pressure difference between the two chambers forms a yardstick for the amount of air conveyed by the combustion air fan, and the diaphragm is moved thereby in such a way that a control valve connected to the diaphragm allows an amount of fuel to pass which is required for the formation of the desired fuel-air ratio. Besides, an electromagnetically operable shutoff valve is provided in most cases in the intake line of the fuel pump which prevents fuel from passing from the fuel tank to the air feed line when the device is turned off. This conventional fuel feeding system thus requires a plurality of individual units and thus is relatively complicated and expensive. The series connection of several throttle points in the feed line of the fuel pump, constituted by the check valve in the feed line of the pump, the control valve actuated by the diaphragm of the metering device, and the fuel nozzle, furthermore impairs the accuracy of the metering action of the fuel pump.

The invention is based, at least in part, on the problem of providing a fuel feeding device for a heating unit of the aforementioned type which is distinguished by a substantially simpler structure and which makes it possible to effect an accurate metering of the amount of fuel, extensively independently of the effects of temperature or air pressure.

This problem is solved, in accordance with a preferred embodiment of the invention, by providing that the fuel feeding device comprises a diaphragm pump, the diaphragm of which separates two chambers from each other, of which the first chamber is in communication, via a valve, with the fuel line and, via a fuel nozzle as well as a check valve, with the air feed line in the zone of the venturi tube, and the second chamber is connected to the air feed line at a position spaced from the venturi tube; and wherein an electromagnet is provided which, upon excitation, moves the diaphragm along the lines of a suction stroke with reference to the first chamber, a switch being disposed in the circuit of the coil of the electromagnet which is closed at the end of the delivery stroke of the diaphragm and opened at the end of the suction stroke.

A suggestion advanced by this invention, therefore, combines the fuel pump and the metering device in one device, wherein the suction stroke of the pump is effected by the electromagnet, whereas the delivery stroke is effected by the pressure difference in the air feed line between the venturi tube and a point outside of the venturi tube and thus is automatically dependent on the amount of air conveyed by the combustion air fan. This suggestion of this invention does not only result in a significant simplification from a constructional viewpoint, it also constitutes a functional improvement over the conventional arrangement, since only a check valve and a fuel nozzle are disposed in the feed line of the pump, whereas the control valve required in the above-discussed known device and actuated by the diaphragm of the metering means has been eliminated.

The valve in the fuel line can be a simple check valve. However, preferably, this valve is a shutoff valve operated by the electromagnet, which is opened when the electromagnet is energized. This, in turn, yields a considerable structural simplification as compared to the conventional devices with a separate solenoid valve.

Preferably, the electromagnet comprises an armature connected, on the one hand, to the diaphragm and, on the other hand, to the valve body of the shutoff valve so that, upon energization of the electromagnet, the valve body and the diaphragm are moved simultaneously, or first the valve body is moved and thereafter the diaphragm. This avoids the disadvantage that, at the beginning of the suction stroke, an unnecessarily high vacuum is produced which could result in the formation of vapor bubbles in the fuel.

In order to be able to execute the delivery stroke of the diaphragm in dependence on the pressure difference alone, it is advantageous to disconnect the armature of the electromagnet mechanically from the diaphragm during the delivery stroke of the latter.

In a preferred embodiment, the armature is disposed to be longitudinally movable in a pipe surrounded by the coil of the electromagnet, this pipe having at one end a valve seat for the valve body of the shutoff valve connected to the armature and terminating at the other end in the second chamber of the diaphragm pump and receiving a plunger arranged with an axial play between the diaphragm and the valve body, this play being larger, when the electromagnet is not energized, than the delivery stroke of the diaphragm. Thus, the diaphragm can execute its delivery stroke without coming into contact with the armature. If the armature is energized, it first lifts the valve body of the shutoff valve off its seat before it can lift the plunger and move the diaphragm to execute its suction stroke.

In vehicle heating units, special difficulties arise with respect to an exact metering of the fuel to be admixed to the conveyed amount of combustion air, since often influential variables are present which change considerably, and which must be taken into account. In this connection, the difficulty occurs that the throughflow characteristics of a venturi tube and of a fuel nozzle, on the basis of the differing flow conditions (one operating in the turbulent zone and the other in the laminar flow zone), do not have a similar curve formation. Thereby, only a relatively narrow region exists within which an ignitable fuel-air mixture is present. Since in case of automotive vehicle heating systems, the combustion of air fan is usually operated by the vehicle battery, the voltage of which is subject to considerable fluctuations during operation, resulting in corresponding variations of the conveyed amount of combustion air, it is advantageous to provide for a control of the differential pressure determining the delivery stroke of the diaphragm pump which is dependent on the amount of air. This can be accomplished, for example, by arranging a spring-loaded displacement member in the venturi, this member changing, with an increasing amount of air and a corresponding back pressure, the cross section of the venturi so that the throughflow characteristics of the venturi and of the fuel nozzle approach each other. Another possibility resides in a variation of the pressure, dependent on the amount of air, in the chamber connected to the air feed line outside of the venturi tube, by means of a controllable blowoff or bleeder valve. Another way to make the throughflow characteristics of the venturi tube and the fuel nozzle approach each other consists in the provision of a spring effective on the diaphragm in the direction of the delivery stroke. Thereby, a change is obtained in the differential pressure at the fuel nozzle, whereby the throughflow quantity of the fuel nozzle is then adapted to the air throughout of the venturi tube within a broad range. Also, frictional and resistance forces of the diaphragm can be compensated for by the spring.

The temperature exerts the greatest influence on the conveyance of the fuel in dependence on the amount of air, since the viscosity of the fuel is temperature-dependent and since the throughflow through the fuel nozzle is, in turn, dependent on the viscosity. Since a vehicle heating unit must operate satisfactorily within a very wide temperature span, the elimination of temperature effects is of special importance. This can be achieved, for example, by providing that the spring effective on the diaphragm in the direction of the delivery stroke is made of a thermal bimetal and is arranged preferably within the fuel stream taken in by the pump. Another correction possibility resides in making the cross section of the fuel nozzle variable in dependence on the fuel temperature, along the lines that the cross section is reduced with an increasing temperature and enlarged with a decreasing temperature. Under practical conditions, this can be accomplished by means of a nozzle having a conical nozzle needle which is displaced, for example, with the aid of an element made of a stretchable material. The same purpose is attained by a temperature-dependent variation of the nozzle length so that this length is reduced with an increase in the temperature. Finally, a temperature-dependent change of the differential pressure between the chambers of the metering pump could also be provided, so that in case of low fuel temperatures a higher differential pressure is ambient than in case of higher temperatures. This could be achieved in practice by means of a blowoff valve connected with the first chamber and operated by an element of a stretchable material.

In preferred embodiments of the invention, the coil of the electromagnet can be arranged on one side and the shutoff valve can be disposed on the other side of the diaphragm, the armature being extended through the diaphragm with the aid of a gasket or other sealing means.

Alternatively, the diaphragm can be equipped with a permanent magnet opposed to one end of the electromagnet, and the shutoff valve can be equipped with a permanent magnet opposed to the other end of the electromagnet, wherein the mutually facing ends of the energized electromagnet and of the permanent magnets have the same polarity. Upon excitation of the electromagnet, the permanent magnets are repelled whereby, on the one hand, the diaphragm is moved in the direction of its suction stroke and, on the other hand, the shutoff valve is moved in the direction toward its open condition.

In each of the above-noted preferred embodiments, a switch is associated with the electric lead to the electromagnet, this switch being operable by the diaphragm.

Additional details and features of the invention can be seen from the following description in conjunction with the drawings wherein several embodiments of the invention are shown in principle.

DETAILED DESCRIPTION OF THE DRAWINGS

Figure 1:
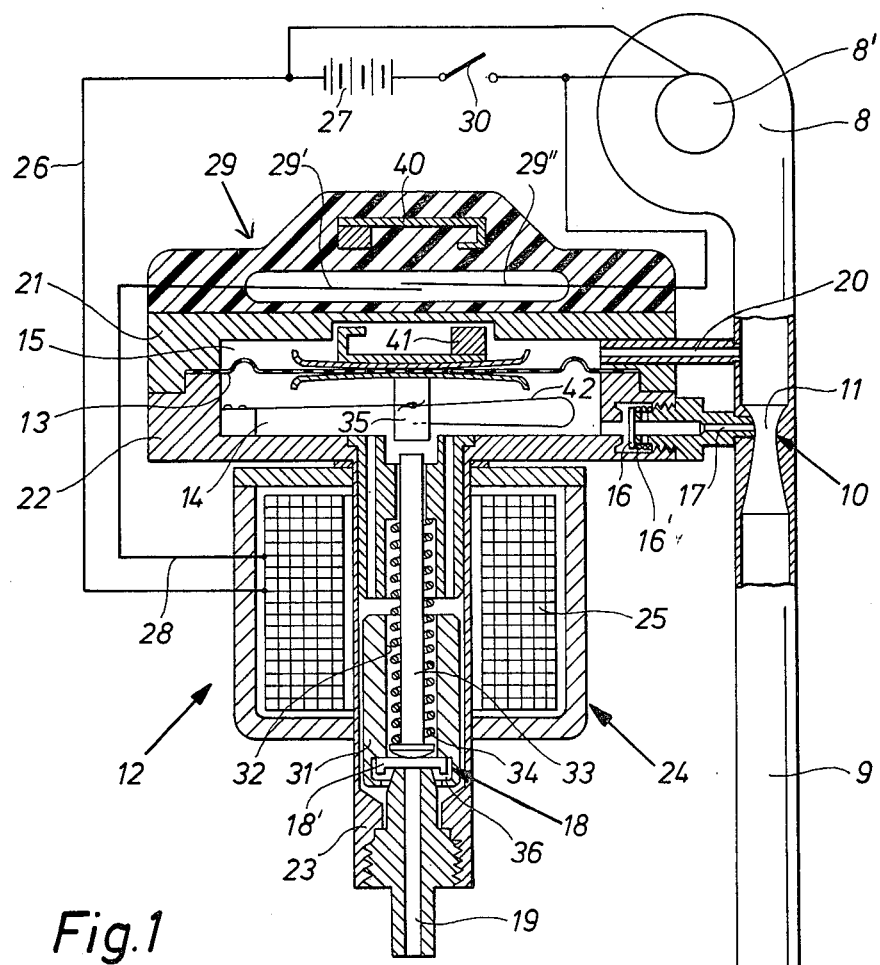
FIG. 1 is a schematic part-sectional view which shows a vehicle heating unit with a fuel feeding device in accordance with a first embodiment of the invention.
Figure 1:
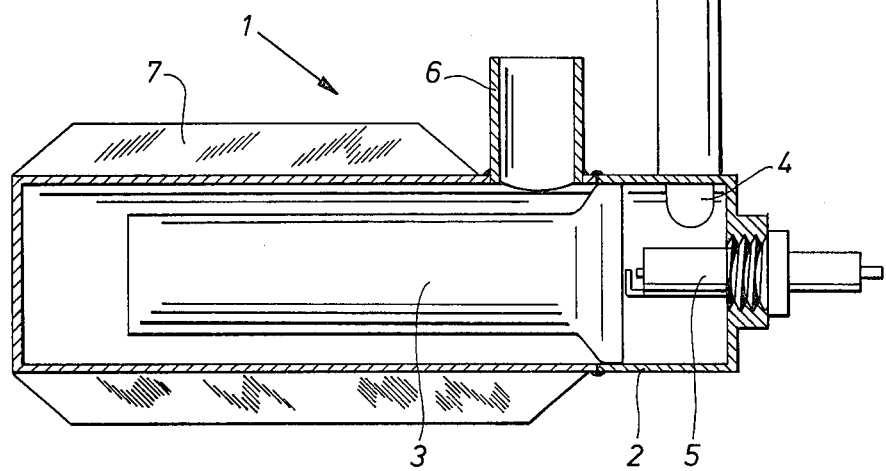

Referring first of all to FIG. 1, a vehicle heating unit 1 is shown comprising a tubular housing 2 wherein a combustion chamber 3 is arranged. The housing 2 has an inlet opening 4 for a fuel-air mixture, a heater (glow) spark plug 5, and an outlet duct 6 for the combusted gases. The housing 2 is provided with external ribs 7, by way of which the heat developed in the heating unit 1 is transferred to an air stream which passes by. To convey the combustion air, a combustion air fan 8 is provided, the delivery line 9 of which terminates in the inlet opening 4 of the heating unit 1. In the delivery line 9 a venturi tube 10 is arranged, the fuel being fed at the constricted point 11 thereof by means of a fuel feeding and metering device generally indicated at 12. The device 12 comprises a diaphragm pump, the diaphragm 13 of which separates two chambers 14 and 15 from each other, of which the first chamber 14 is in communication with the constriction 11 of the venturi 10 by way of a check valve 16 and a fuel nozzle 17. Furthermore, the chamber 14 is connected, via a shutoff valve 18, with a conduit 19 leading to the fuel tank, the latter not being shown. The chamber 15 is in communication, via a conduit 20, with the air feed line 9 upstream of the venturi 10.

The diaphragm pump has a bipartite housing 21, 22, provided with a tubular extension 23 receiving the conduit 19 and the shutoff valve 18 and being in communication with the chamber 14. The tubular extension 23 is surrounded by an electromagnet 24, the coil 25 of which is connected, on the one hand, via a conduit 26 directly to a pole of the vehicle battery 27 and, on the other hand, via a conduit 28, a solenoid switch 29, and a master switch 30 to the other pole of the vehicle battery 27. The fan motor 8' is likewise connected to the vehicle battery 27, on the one hand directly and on the other hand by way of the master switch 30. The electromagnet 24 comprises an armature 31 provided with a central bore 32 wherein a nonmagnetic pin 33 is loosely disposed and pressed by means of a spring 34 against the valve body 18' of the shutoff valve 18. The pin 33 extends into the close proximity of a central extension 35 of the diaphragm 13. The valve body 18' is arranged in a recess 36 of the armature 31 so that it is entrained, upon a movement of the armature 31 in the upward direction, based on the illustration in the drawing, by the armature.

The mode of operation of this device of FIG. 1 is as follows:

In the illustrated position, the device is turned off, and all components are in the rest condition. The solenoid switch 29 is open, since its contact arms 29' and 29" are in an equilibrium condition under the effect of the permanent magnets 40 and 41, the magnet 40 being stationary and the magnet 41 being attached to the diaphragm 13. If the master switch 30 is closed, the fan motor 8' is supplied with current, and the fan 8 conveys combustion air through the delivery line 9 to the heating unit 1. During this process, a vacuum is produced in the constriction 11 of the venturi 10, which vacuum is effective in chamber 14 on the diaphragm 13, together with the higher pressure ambient in the chamber 15, and tends to move the diaphragm 13 downwardly, from the position shown in the drawing. This movement, corresponding to the delivery stroke, can be executed freely, since the diaphragm 13 is not connected to the pin 33 or to the armature 31. At a certain point of the downward movement, of diaphragm 13, the effect of the magnet 41 on the contact arms 29', 29" becomes so minor that practically only the force of the magnet 40 is still effective, which magnet 40 now closes the switch 29 whereby the coil 25 of the electromagnet 24 is supplied with current. As a consequence, the armature 31 is moved in the upward direction, based on the illustration in the drawing, and during this step first the valve body 18' is lifted off its seat and then the diaphragm 13 is moved in the upward direction by way of the pin 33 and the extension 35. This corresponds to the suction stroke of the diaphragm pump, and fuel is taken in via the line 19 into the chamber 14. The check valve 16 is maintained in the closed position by the spring 16' during this step. At the end of the upward movement of the diaphragm 13, the force of the magnet 41 becomes effective again, which opens the solenoid switch 29, thus interrupting the current to the coil 25. At this point in time, only the differential pressure between the constriction 11 of the venturi 10 and the termination of line 20 into the delivery line 9 is effective on the diaphragm 13. Under the effect of this differential pressure, the diaphragm 13 moves in the downward direction as seen in the drawing, whereby the fuel conveyed into the chamber 14 is conducted via the check valve 16 and the fuel nozzle 17 into the combustion air flowing through conduit 9. The valve body 18' of the shutoff valve 18 had previously been pressed onto its seat by means of the spring 34, whereby an effective blockage of the line 19 is obtained.

Since the diaphragm 13 is in driving connection with the armature 31 of the electromagnet only during its suction stroke, whereas it is mechanically decoupled from the armature during the delivery stroke, the diaphragm can execute its delivery stroke solely in dependence on the pressure difference.

As can be seen, the arrangement is such that, upon excitation of the winding 25 of the electromagnet 24, the valve body 18' of the shutoff valve 18 is moved first of all, and only thereafter the diaphragm 13 is being moved. This avoids the disadvantage that, at the beginning of the suction stroke, an unnecessarily high vacuum is produced in the chamber 14, which could promote the formation of vapor bubbles in the fuel.

To make the throughflow characteristics of the venturi tube 10 and of the fuel nozzle 17 correspond with one another, a spring 42 is provided which acts on the diaphragm 13 along the lines of its delivery stroke. This spring 42 can consist of a thermal bimetal and is arranged, in the present embodiment, within the chamber 14 through which the fuel is flowing. Thereby, the force effective on the diaphragm can be influenced in dependence on the temperature of the fuel. This is of importance, because the throughflow through the fuel nozzle 17 is dependent on the fuel viscosity and thus on the fuel temperature. Therefore, at low temperatures, the differential pressure at the fuel nozzle becomes higher than at higher temperatures.

Figure 2:
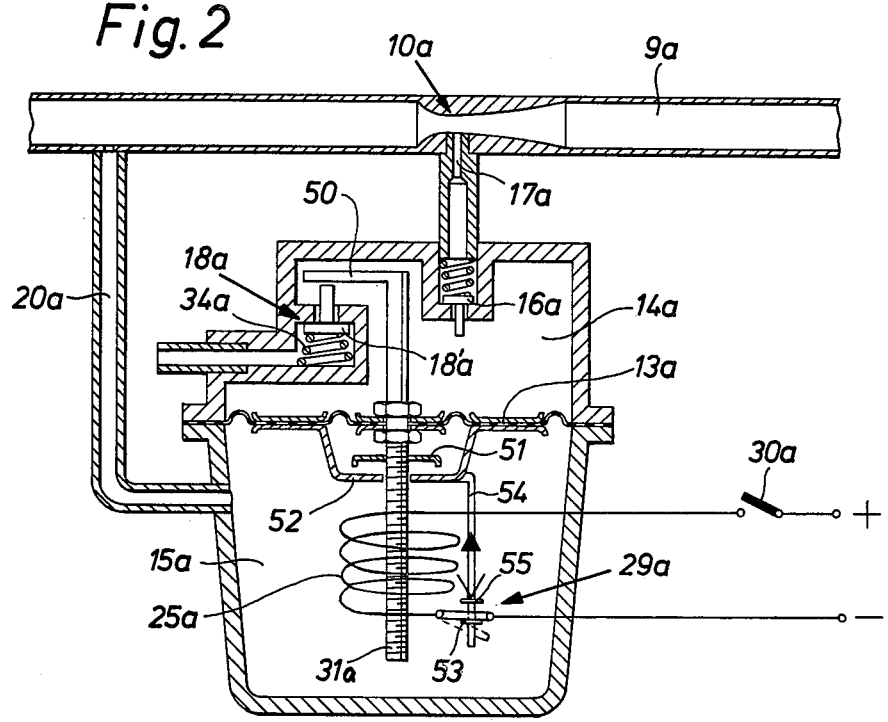
FIG. 2 is a schematic part-sectional view of a fuel feeding device constructed in accordance with a second embodiment of the invention.

In the embodiment of FIG. 2, wherein parts corresponding to those in FIG. 1 are denoted by the same reference numeral, but with the index "a", the coil 25a of the electromagnet is arranged on one side of the diaphragm 13a, and the shutoff valve 18a is arranged on the other side of the diaphragm. The armature 31a of the electromagnet extends sealingly through the diaphragm 13a and carries at its upper end an extension 50 acting on the valve body 18'a of the shutoff valve 18a. In order to move the diaphragm 13a, the armature is provided with a stop 51 cooperating with a counter stop 52 mounted at the diaphragm 13a.

The mode of operation of this device of FIG. 2 is substantially similar to that of the first embodiment of FIG. 1. When the device is turned on, the master switch 30a is closed first of all, and the fan motor is switched on. The air flowing through the feed line 9a generates a vacuum at the venturi 10a, tending to urge the diaphragm 13a in the upward direction, based on the illustration in the drawing. The pressure effective by way of the conduit 20a in the chamber 15a acts in the same direction. At the end of the upward stroke of the diaphragm 13a, the switch 29a is closed by the stop 53 disposed on a rod 54 connected to the diaphragm 13a, and the coil 25a of the electromagnet is supplied with current. This position is shown in FIG. 2. During the subsequent downward stroke of the armature 31a, the shutoff valve 18a is first opened up, and then the stops 51 and 52 come into contact with each other, whereby the diaphragm 13a is entrained. At the end of the suction stroke of the diaphragm 13a, the switch 29a is opened by the second stop 55 disposed on the rod 54. The shutoff valve 18a is closed by the spring 34a, thus simultaneously entraining the armature 31a, and the diaphragm 13a now executes its delivery stroke, determined exclusively by the magnitude of the pressure difference between the chambers 14a and 15a.

Figure 3:
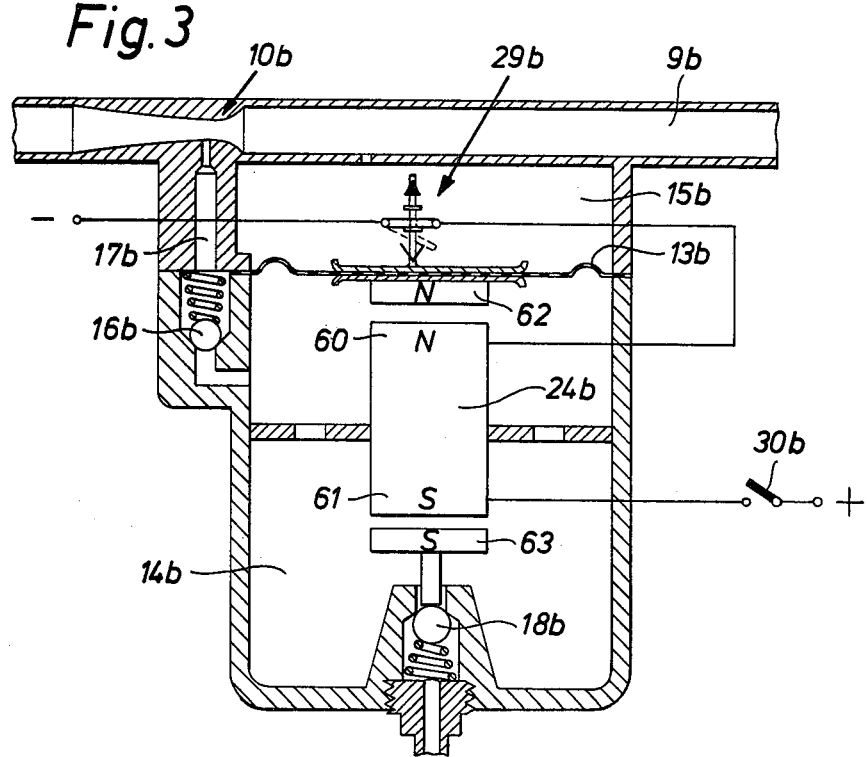
FIG. 3 is a schematic part-sectional view of a fuel feeding device constructed in accordance with a third embodiment of the invention.

In the embodiment of FIG. 3, wherein parts corresponding to those in FIG. 1 again bear the same reference numerals, but with the index "b", an electromagnet 24b is provided which, as contrasted to the two preceding examples, does not have a movable armature. In contrast thereto, in opposition to the ends 60 and 61 of the electromagnet 24b, a permanent magnet 62 is provided at the diaphragm 13b, on the one hand, and a permanent magnet 63 is arranged on the valve body of the shutoff valve 18b, on the other hand. The mutually facing ends of the energized electromagnet 24b and of the permanent magnets 62 and 63 have the same polarity. Thus, once the switch 29b, constructed like the switch 29a in FIG. 2, is closed at the end of the delivery stroke of the diaphragm 13b, and the coil of the electromagnet 24b is excited, the permanent magnets 62 and 63 are repelled. As a consequence, the shutoff valve 18b is opened, on the one hand, and the diaphragm 13b is moved upwardly, as seen in the drawing, on the other hand, i.e. it executes its suction stroke.

While we have shown and described only several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. Fuel feeding apparatus for a vehicle heating unit or the like; said apparatus comprising:
   combustion air conveying means,
   a combustion air feed line for connecting said air conveying means with a combustion chamber,
   venturi tube means in said feed line spaced from said air conveying means,
   fuel feed line means opening into said air feed line at said venturi tube means,
   a fuel supply line,
   and diaphragm pump means for pumping fuel from said fuel supply line into said fuel feed line means, said diaphragm pump means including:
      a movable diaphragm separating first and second chambers, said first chamber being connected with said fuel supply line and with said fuel feed line means, said second chamber being connected with said air feed line by a branch air line which is spaced from said venturi tube means, said diaphragm being movable to perform a pump fuel delivery stroke directly by the pressure difference in said branch air line and in said fuel feed line means at said venturi tube means,
      diaphragm return means for moving said diaphragm to perform a pump suction stroke,
      and switching means for controlling actuation of said diaphragm return means in dependence on the position of said diaphragm.

2. Apparatus according to claim 1, wherein said air conveying means is a combustion air fan disposed upstream of said venturi tube means, wherein said diaphragm return means includes an electromagnet which moves said diaphragm to perform the pump suction stroke when electrical current is supplied thereto, and wherein said switching means includes means for closing a switch supplying electrical current to said electromagnet at the end of the pump delivery stroke and for opening said switch at the end of the pump suction stroke.

3. Apparatus according to claim 1, wherein a check valve and a fuel nozzle are provided at said fuel feed line means, and wherein a closure valve is provided at the connection between said fuel supply line and said first chamber.

4. Apparatus according to claim 2, wherein a check valve and a fuel nozzle are provided at said fuel feed line means, and wherein a closure valve is provided at the connection between said fuel supply line and said first chamber.

5. Apparatus according to claim 4, wherein the closure valve is fashioned as a shutoff valve which is moved by the electromagnet upon excitation thereof in the direction toward opening of the valve.

6. Apparatus according to claim 5, wherein the electromagnet has an armature which is engageable on the one hand, with the diaphragm and, on the other hand, with a valve body of the closure valve so that, upon energization of the electromagnet, first the valve body is moved and then the diaphragm is moved.

7. Apparatus according to claim 6, wherein the armature of the electromagnet is mechanically decoupled from the delivery part of the diaphragm during the delivery stroke of the diaphragm.

8. Apparatus according to claim 6, wherein the armature is arranged to be longitudinally movable in a pipe surrounded by the coil of the electromagnet, this pipe having at one end a valve seat for the valve body of the closure valve and at the other end terminates in the first chamber of the diaphragm pump and receives a plunger arranged between the diaphragm and the valve body with an axial play which is larger in the rest condition than the delivery stroke of the diaphragm.

9. Apparatus according to claim 7, wherein the armature is arranged to be longitudinally movable in a pipe surrounded by the coil of the electromagnet, this pipe having at one end a valve seat for the valve body of the closure valve and at the other end terminates in the first chamber of the diaphragm pump and receives a plunger arranged between the diaphragm and the valve body with an axial play which is larger in the rest condition than the delivery stroke of the diaphragm.

10. Apparatus according to claim 6, wherein the coil of the electromagnet is arranged on one side of the diaphragm and the closure valve is arranged on the other side of the diaphragm, and the armature is sealingly extended through the diaphragm.

11. Apparatus according to claim 5, wherein the diaphragm has a permanent magnet opposed to one end of the electromagnet and the closure valve has a permanent magnet opposed to the other end of the electromagnet, wherein the mutually facing ends of the excitable electromagnet and of the permanent magnets have the same polarity.

12. Apparatus according to claim 2, wherein a switch is disposed in the electric lead to the electromagnet, this switch being operable directly or indirectly by the diaphragm at the end of its delivery stroke along the lines of closing and at the end of the suction stroke along the lines of opening.

13. Apparatus according to claim 8, wherein a switch is disposed in the electric lead to the electromagnet, this switch being operable directly or indirectly by the diaphragm at the end of its delivery stroke along the lines of closing and at the end of the suction stroke along the lines of opening.

14. Apparatus according to claim 1, wherein the diaphragm is under the effect of a spring which acts on the diaphragm along the lines of the delivery stroke.

15. Apparatus according to claim 9, wherein the diaphragm is under the effect of a spring which acts on the diaphragm along the lines of the delivery stroke.

16. Apparatus according to claim 14, wherein the spring consists of a thermal bimetal and is arranged preferably within the fuel stream taken in by the pump.

17. Apparatus according to claim 15, wherein the spring consists of a thermal bimetal and is arranged preferably within the fuel stream taken in by the pump.

18. Apparatus according to claim 1, wherein the cross section of a fuel nozzle in said fuel feed line means is automatically variable in dependence on the fuel temperature, along the lines that this cross section is reduced with increasing temperature and enlarged with decreasing temperature.

19. Apparatus according to claim 5, wherein the cross section of the fuel nozzle in said fuel feed line means is automatically variable in dependence on the fuel temperature, along the lines that this cross section is reduced with increasing temperature and enlarged with decreasing temperature.

20. Apparatus according to claim 1, wherein the length of a fuel nozzle in said fuel feed line means is automatically variable in dependence on the fuel temperature, along the lines that this length is increased with rising temperature and reduced with dropping temperature.

21. Apparatus according to claim 5, wherein the length of the fuel nozzle in said fuel feed line means is automatically variable in dependence on the fuel temperature, along the lines that this length is increased with rising temperature and reduced with dropping temperature.

22. Apparatus according to claim 1, wherein means are provided for the temperature-dependent variation of the differential pressure between the two chambers so that, with a low fuel temperature a higher differential pressure is ambient than at a higher fuel temperature.

23. Apparatus according to claim 5, wherein means are provided for the temperature-dependent variation of the differential pressure between the two chambers so that, with a low fuel temperature a higher differential pressure is ambient than at a higher fuel temperature.

24. Apparatus according to claim 9, wherein means are provided for the temperature-dependent variation of the differential pressure between the two chambers so that, with a low fuel temperature a higher differential pressure is ambient than at a higher fuel temperature.

25. Apparatus according to claim 1, wherein the cross section of the venturi tube is variable in dependence on the amount of air conveyed by the air conveying means.

26. Apparatus according to claim 9, wherein the cross section of the venturi tube is variable in dependence on the amount of air conveyed by the air conveying means.

27. Apparatus according to claim 1, wherein a blow-off valve is connected to the second chamber of the diaphragm pump, this valve being operable in dependence on the amount of air conveyed by the air conveying means in order to maintain the differential pressure between the two chambers of the diaphragm pump at an essentially constant value.

28. Apparatus according to claim 9, wherein a blow-off valve is connected to the second chamber of the diaphragm pump, this valve being operable in dependence on the amount of air conveyed by the air conveying means in order to maintain the differential pressure between the two chambers of the diaphragm pump at an essentially constant value.

* * * * *